Figure 7:
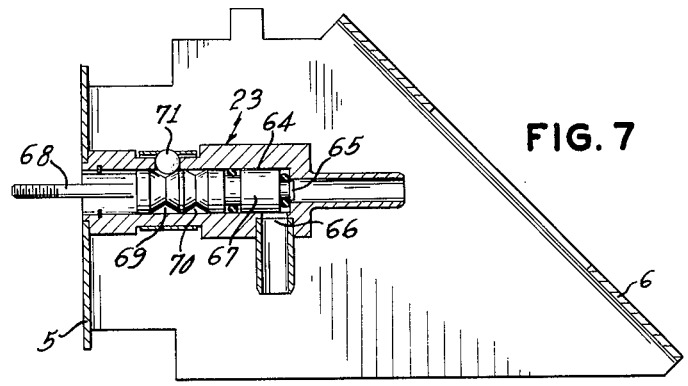

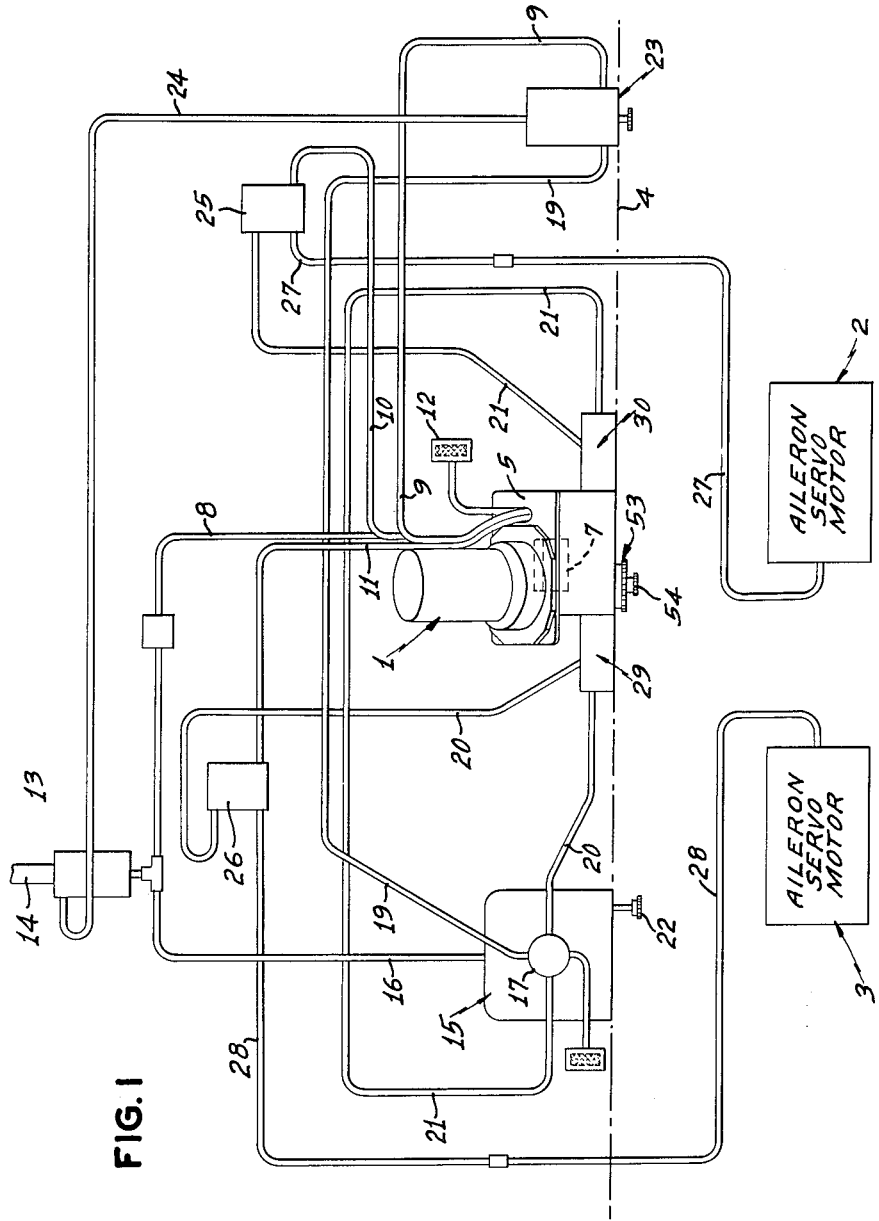

Aug. 3, 1965  W. M. TEMPLIN ET AL  3,198,031
AUTOPILOT CONTROL
Filed July 27, 1962  4 Sheets-Sheet 2
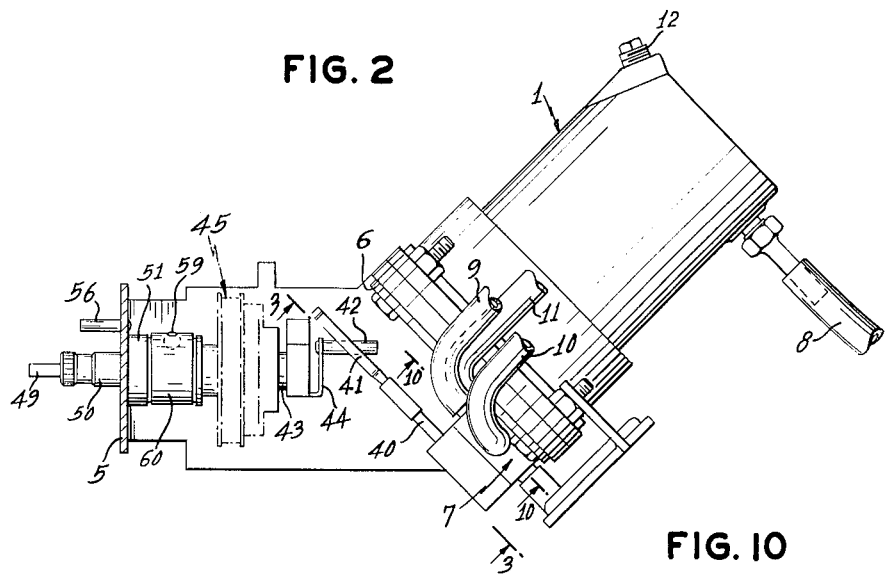
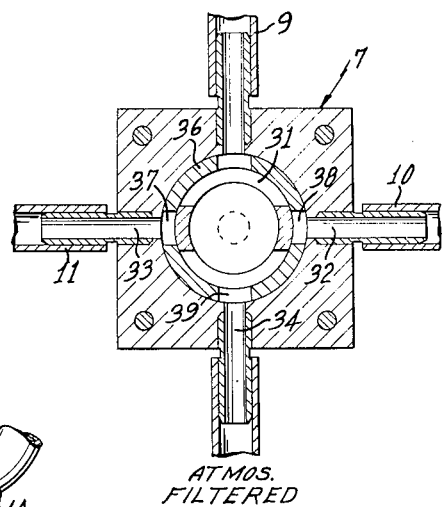
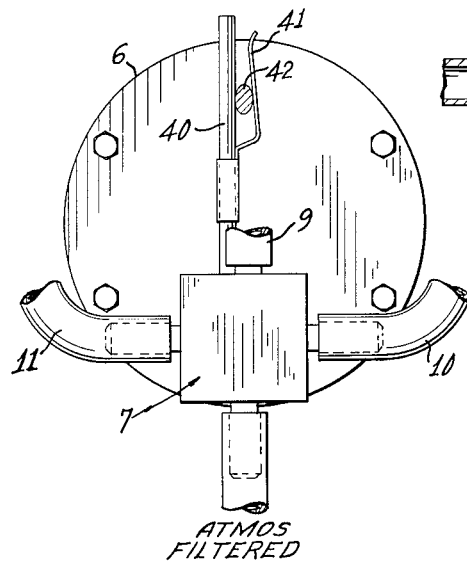
INVENTORS
Walter M. Templin
James Gasho
BY
*McGregor & Brenneman*
ATTORNEYS

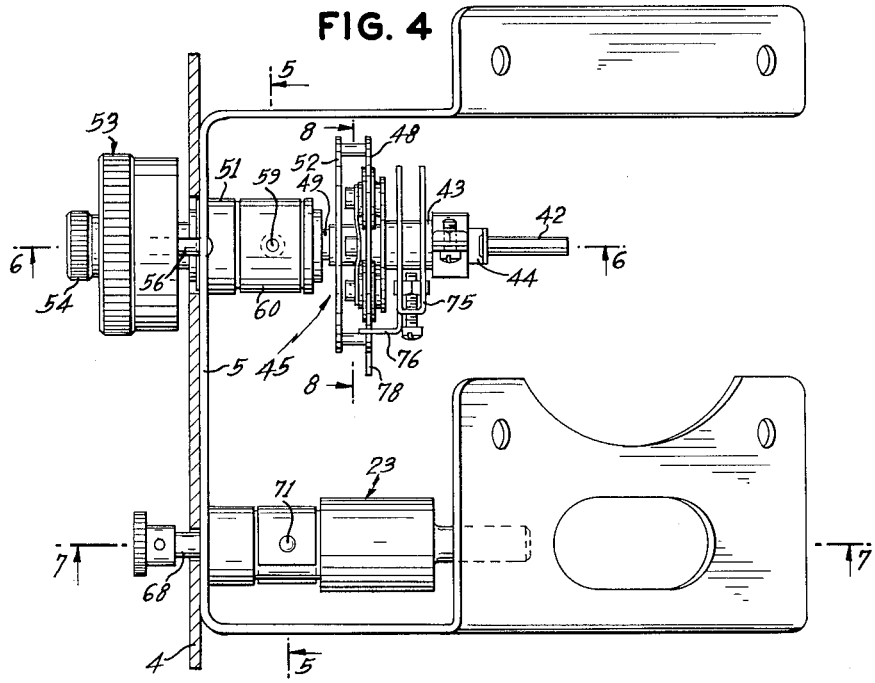
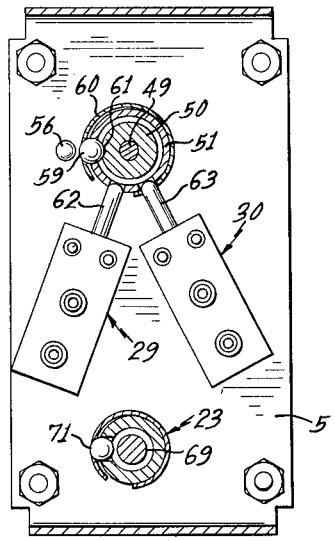
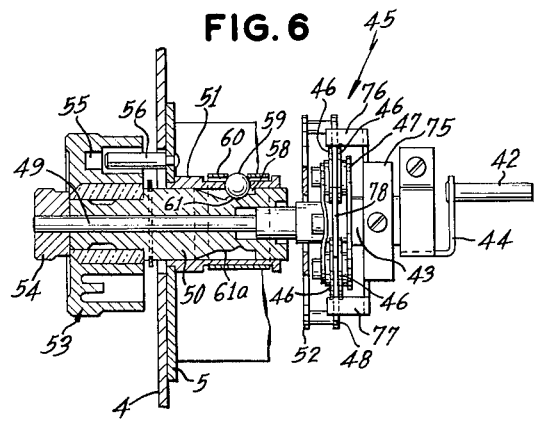

Aug. 3, 1965   W. M. TEMPLIN ET AL   3,198,031
AUTOPILOT CONTROL
Filed July 27, 1962   4 Sheets-Sheet 4

INVENTORS
Walter M. Templin
James Gasho
BY
McBryan & Eisenman
ATTORNEYS

United States Patent Office 3,198,031
Patented Aug. 3, 1965

3,198,031
AUTOPILOT CONTROL
Walter M. Templin, Wayne, and James E. Gasho, Glenolden, Pa., assignors to Tactair, Inc., Bridgeport, Pa., a corporation of Delaware
Filed July 27, 1962, Ser. No. 212,979
5 Claims. (Cl. 74—504)

This invention relates to aircraft autopilots, and more particularly to improvements in automatic stabilization systems are adaptable for light aircraft, providing satisclined axis rate gyro are utilized for aileron control. Such systems are adapted for light aircraft, providing satisfactory roll-yaw stablization with simple apparatus that is inexpensive and light in weight.

The principal object of the invention is to provide an improved control unit for systems of the above type, including selector means for commanding stabilized turns, and adjustable trim control means, said means being combined in such manner as to facilitate appropriate manipulation by the operator.

Another object is to provide a control unit adapted for use with stabilization systems that include a directional gyro contributing a heading reference component to the aileron control signal, said control unit including means coordinated with the turn command selector to automatically remove the heading reference control component when a turn is commanded.

In a presently preferred embodiment of the invention, the entire system is pneumatically energized, the power being supplied from the engine-driven vacuum system, or from a venturi disposed in the slipstream. The rate gyro may be a standard type of air-driven turn and slip indicator mounted in a properly tilted position and modified to actuate a differential valve controlling opposed pneumatic motors connected to the aileron linkage.

The differential valve includes an adjustable member arranged so that motion of the member from a midposition shifts the null of the differential valve with respect to that of the rate gyro and adds a roll bias to the control signal. The adjustable member is mechanically coupled to a turn control knob to be rotated thereby to selected positions corresponding to predetermined commanded turn rates. The adjustable member is also connected through a vernier or slow motion drive to a trim knob, for introducing a small precisely adjustable roll bias.

The turn control knob is arranged to be locked against rotation when pushed in, and unlocked when pulled out. Its longitudinally movable shaft is provided with cam surfaces arranged to actuate shut-off valves and disconnect the directional gyro, if one is used, from the aileron motors.

Figures 8, 9:
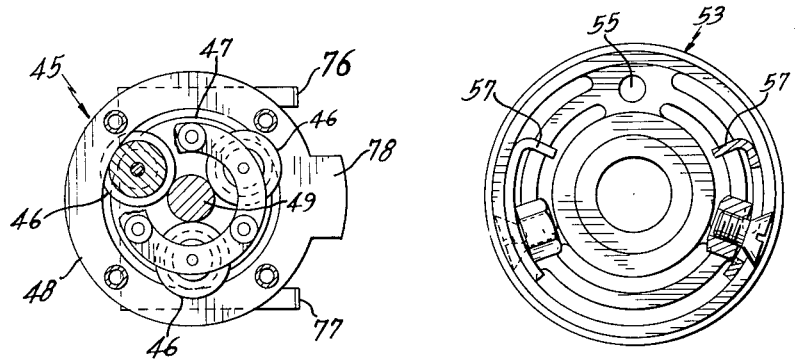

The invention will be described with reference to the accompanying drawings, wherein:

FIG. 1 is a schematic diagram of a roll-yaw stabilization system including a directional gyro heading reference, showing the operating elements and their vacuum line interconnections, FIG. 2 is a side view of the rate gyro and its control assembly, including the linkages between the differential valve and the turn command and trim knobs, FIG. 3 is a front view of the differential control valve and the cover plate by which it is supported on the rate gyro, FIG. 4 is a plan view of the control assembly, FIG. 5 is a cross sectional view of the control assembly, taken in the plane 5—5 of FIG. 4, FIG. 6 is a cross sectional view taken in the plane 6—6 of FIG. 4, FIG. 7 is a cross sectional view taken in the plane 7—7 of FIG. 4, FIG. 8 is a cross sectional view taken in the plane 8—8 of FIG. 4, FIG. 9 is a rear view of the turn command knob, and FIG. 10 is a transverse cross sectional view of the differential valve.

Referring to FIG. 1, the illustrated system is of the same general type as that shown in FIG. 3 of De Florez U.S. Patent No. 2,199,256, including an inclined axis rate gyro 1 responsive to roll and yaw to energize motors 2 and 3 and thereby actuate the ailerons of the craft to maintain it in a wings-level attitude and at substantially constant heading.

The rate gyro 1 is mounted behind the craft's instrument panel 4 by means of a bracket 5 designed to support the gyro 1 with its gimbal axis in a plane parallel to the longitudinal axis of the craft and inclined toward the vertical at an angle of about 45 degrees when the craft is in the pitch attitude of normal horizontal flight. The exact optimum value of the tilt angle depends upon the roll-yaw interaction characteristics of the particular aircraft and should be determined accordingly.

Referring to FIG. 2, the rate gyro 1 may be a conventional air-driven turn and slip indicator from which the visual indicator member and transparent face cover have been removed, the latter being replaced by a metal plate 6 supporting a differential valve 7. The control element of the valve 7 is connected to the mechanism in the gyro 1 originally provided to drive the visual indicator.

Power for spinning the rotor of the gyro 1 is supplied by way of a vacuum line 8. Ambient air enters the gyro casing through a filter 12. Another line 9 supplies vacuum input to the valve 7, which, upon displacement of its control element from a null position, applies said input to one or the other of two output lines 10 and 11. FIG. 3 shows a front view of the valve 7 and cover plate 6, looking toward the body of the rate gyro 1.

Returning to FIG. 1, the spin power supply line 8 is connected to a manifold device 13 on a main vacuum line 14, which leads to a vacuum source, not shown. Power for spinning the rotor of a directional gyro 15 is also supplied from the manifold 13, by way of a line 16.

The directional gyro 15 shown in FIG. 1 is of a well-known type having a control valve 17 provided with an input line 19 and two output lines 20 and 21, selectively energized by operation of the valve 17 when the heading of the craft departs from that selected by means of a manually adjustable course selector knob 22.

The control power supply lines 9 and 19 of the rate gyro 1 and directional gyro 15 are connected through a main shutoff valve 23 and a common line 24 to the manifold 13. The control output lines 10 and 11 from the rate gyro valve 7 go to manifolds 25 and 26 respectively provided with output lines 27 and 28 connected to the aileron actuator motors 2 and 3. The control output lines 20 and 21 from the directional gyro valve 17 go through respective shutoff valves 29 and 30 to the manifolds 26 and 25.

The manifolds 25 and 26 include flow restrictors, preferably valves that can be adjusted and fixed in adjustment as by means of a screwdriver. The purpose of the flow restrictors is to set the relationship between the effects of the rate gyro and directional gyro control outputs so that the directional gyro cannot overcome the rate gyro under any circumstances.

Referring to FIG. 10, the differential control valve 7 is of conventional design, including a rotor or spool member 31 arranged to selectively connect either of ports 32 or 33, associated with output lines 10 and 11, to a port 34 associated with input line 9. The rotor 31 is coupled to the gimbal of the rate gyro 1, to be rotated thereby in response to roll and/or yaw of the aircraft. When the valve is in its null position as shown in FIG. 7, both ports 32 and 33 are covered. The null position of the rate gyro gimbal is that corresponding to zero roll and zero yaw, when the gimbal is spring-centered.

The valve 7 is arranged so that its null position can be adjustably displaced with respect to that of the rate gyro, for example by rotating the housing, as in the above-mentioned De Florez patent, or by provision of a sleeve 36 surrounding the valve rotor 31 and provided with ports 37, 38 and 39 as shown in FIG. 7. The valve shown in FIG. 7 is substantially the same as the valve 14' shown in FIG. 2 of Harcum et al. Patent 2,611,560, wherein the sleeve 61 corresponds in structure and function to the sleeve 36 herein. Rotation of the sleeve 36 changes the null position of the valve by displacing the inlet ports 37 and 38.

Referring to FIG. 3, the null adjustment member of the valve 7 is provided with a control rod 40 extending upwardly from the valve and laterally movable through a sector about the axis of the valve. A spring clip 41 is secured to the rod 40 to hold it in engagement with a pin 42 (FIG. 2).

The pin 42 is eccentrically disposed at the end of a shaft 43, being supported thereon by means of a bracket 44 clamped to the end of the shaft 43, as shown best in FIG. 6. The shaft 43 is the output shaft of a two-speed planetary transmission 45 of the friction type, such as that commonly used in so-called "vernier" dials for radio apparatus.

As shown in FIGS. 4, 6 and 8, the transmission device 45 comprises three pairs of spring discs 46 rotatably mounted on a spider member or disc 47 at 120 degree intervals in frictional engagement with the interior edge of a thin ring member 48 and with a centrally disposed shaft 49. The spider 47 is secured to the output shaft 43. The shaft 49 is rotatably supported in a hollow coaxially disposed outer shaft 50 (see FIG. 6) which in turn is rotatably and slidably supported in a bushing 51 secured to the panel surface of the bracket 5. The outer shaft 50 is coupled to the ring member 48 by means of a spring disc 52 centrally secured to the shaft 50 and connected peripherally at several points to the rings 48.

A trim stop member 75 is secured to the output shaft 43, and carries a pair of tabs 76 and 77 adapted to abut with a tab 78 (see FIG. 8) extending outwardly from the ring 48.

As shown in FIGS. 4 and 6, a turn control knob 53 is secured at the end of the shaft 50. The knob 53 has a central aperture to fit the shaft 50 and to permit passage of the shaft 49. A trim control knob 54 is mounted on the end of the shaft 49. The knob 53 is provided with an opening 55 adapted to engage a stop pin 56 secured to the bracket 5, when the knob 53 is pushed in. The back of the knob 53 is formed to provide an annular hollow space, as shown in FIG. 6, which permits rotation of the knob when it is pulled out.

Referring to FIG. 9, a pair of stop members 57 are adjustably secured within the hollow space at the back of the knob 53, and are arranged to limit the rotary motion of the knob when it is pulled out, by abutment with the pin 56 (FIG. 6) when the knob is rotated far enough in either direction from its centered position.

The turn control shaft 50 is provided, near its right hand end as viewed in FIG. 6, with a circumferential groove 58. A ball 59 is supported in a hole in the wall of the bushing 51 and retained there by an arcuate leaf spring 60 which urges the ball inwardly toward the shaft 50. When the shaft 50 is pulled out, the ball 59 cooperates as a detent with the groove 58 to hold the shaft in its outer position while permitting rotation. The groove 58 is made slightly wider at the point where it engages the ball 59 when the shaft 50 is centered, to provide a tactile indication. A depression 61 in the surface of the shaft 50 adjacent the groove 58 holds the shaft in its inner position after it is pushed in.

The directional gyro shutoff valves 29 and 30 may be mounted on the bracket 5 near the bushing 51 as shown in FIG. 5. Their actuator rods 62 and 63 extend through holes in the bushing to the surface of the turn control shaft 50. The shaft 50 is formed with a conical cam surface 61a engaging the ends of the control rods 62 and 63. Suitable bias means, such as compression springs within the valves 29 and 30, urge the rods 62 and 63 into engagement with the cam surface 61a on the shaft 50. When the knob 53 is pulled out, the rods 62 and 63 are forced inward radially of the shaft 50, and the valves 29 and 30 are closed.

The internal construction of the valves 29 and 30 is similar to that of the main shutoff valve 23 which is shown in FIG. 7. A cylindrical valve chamber 64 is provided with vacuum inlet and outlet ports 65 and 66, and contains a reciprocable closure member 67 provided with an actuating rod 68. The valve is shown in its closed condition, with the closure member in its right hand position in FIG. 7, with the actuator rod 68 pushed in. When the rod 68 is pulled out, the valve is open. Detent grooves 69 and 70 are engaged by a ball 71 to hold the valve closed or open, respectively.

In the operation of the described system, spin power is supplied to both gyros at all times when the aircraft is in flight. The turn command knob 53 is normally centered and pushed in. The autopilot is engaged by simply pulling out the knob on the valve 23, supplying power to the gyro operated control valves 7 and 17. The knob 22 on the directional gyro 15 is set to the desired heading, and the valve 17 is operated in response to departure of the craft from said heading to energize one of the opposed aileron motors 2 and 3 to bank the craft and induce a turn toward the preset heading.

The rate gyro 1 responds to both turn and roll motions of the craft to operate the valve 7 for controlling the aileron motors 2 and 3 in such sense as to reduce the rate of turn and the rate of bank, i.e. roll, toward zero. Thus, any turn control signal produced by the directional gyro 15 is opposed by the signal from the rate gyro 1 produced in response to the rate of turn and the accompanying roll caused by the directional gyro. The result is that the directional gyro acts to supply a long-term slowly effective component to the control of the craft, and the rate gyro supplies a short-term quickly effective component responsive to rapid momentary movements of the craft in yaw and roll, such as result from gusts.

A persistent tendency to bank or turn in one direction resulting from lateral imbalance or propellor torque, for example, can be corrected by rotating the trim control knob 54. This rotates the inner shaft 49, causing the spring discs 46 to roll around the inside of the ring 48 of the transmission device 45.

The ring is held against rotation by its connection through the outer shaft 50 to the turn command knob 53, which in turn is held against rotation by the stop 56. Accordingly, the spider 47 rotates slowly, say at about one eighth the speed of rotation of the trim control knob. The output shaft 43, being connected to the spider 47, rotates with it, moving the eccentrically disposed pin through an arc to drive the valve control rod 40 (FIGS. 2 and 3) and apply a precisely adjustable trim bias to the valve 7.

When it is desired to execute a command turn, i.e. cause the aircraft to turn at a selected rate, the knob 53 is pulled out and rotated in the direction of the desired turn, by an amount corresponding to the desired rate. Pulling out the knob 53 closes the valves 29 and 30 as described, to cut off the control signals from the directional gyro. Rotation of the knob 53 rotates the shaft 50, and with it the ring member 48 of the transmission 45. Owing to friction and mechanical advantage, the spring discs 46, spider 47, and trim control shaft 49 will rotate with the ring 48 as a unit, and the output shaft 43 is effectively directly connected to the knob 53. The eccentric pin 42 moves through the same angle as the knob 53, operating the rod 40 to bias the valve 7 by an amount corresponding to the desired rate of turn.

As the command turn approaches completion, the knob 53 is manually rotated toward its centered position, then pushed in. The trim setting will remain as it was before the turn was executed, and the directional gyro will be reengaged.

The described control unit occupies a minimum of panel space while affording complete flexibility and convenience of operation. The rate gyro and control unit may be installed and used in a craft without a directional gyro, or combined with a directional gyro already present. If the directional gyro becomes inoperative, or none is used, the rate gyro alone will provide substantial heading stabilization as a result of the effective roll and yaw compensation. This is of particular interest in connection with light aircraft, where the expense of instrumentation is often a major matter.

I claim:

1. A control unit for aircraft stabilization systems having a movable input member for controlling the aircraft including a rotary motion transmission device having an output shaft coupled to said movable member, a first axially movable and rotatable input shaft coupled to said output shaft in a relatively low input-to-output speed relationship, and a second rotatable input shaft including step-down motion transmission means coupled to said output shaft to afford relatively high input-to-output speed relationship, a first control knob on said first input shaft, means to hold said knob in a centered position against rotation when it is moved in one direction axially with said first shaft and to allow limited rotation when said knob is moved in the other direction axially of said shaft, and a second control knob on said second input shaft.

2. The invention set forth in claim 1, wherein said first input shaft is hollow, concentrically surrounds said second input shaft and is longitudinally slidable thereon.

3. The invention set forth in claim 1, further including shutoff means having a cam follower element movable selectively to on and off positions, said first input shaft being provided with a coaxially disposed cam surface cooperative with said cam follower element to move said element to its off position when said first control knob is moved to be released for rotation.

4. A control unit for aircraft stabilization systems, said control unit including a rotary motion transmission device having an output shaft coupled to said movable member, a first input shaft coupled to said output shaft in a relatively low input to output speed relationship, and a second input shaft including step-down motion transmission means coupled to said output shaft to afford relatively high input to output speed relationship, said first input shaft being hollow and concentrically surrounding said second input shaft and longitudinally slidable thereon; a first turn control knob mounted on said first input shaft, means to engage said knob and hold it in a centered position against rotation when said knob is moved to one extreme of the longitudinal movement of said first input shaft, said knob being disengaged from said means to engage said knob to allow limited rotation when said knob is moved to the other extreme of the longitudinal motion of said first input shaft, and a second control knob mounted on said second input shaft adjacent said first control knob.

5. A control unit for aircraft stabilization systems having a movable input member for controlling the aircraft including a rotary motion transmission device having an output shaft coupled to said movable member, a first input shaft coupled to said output shaft in a relatively low input-to-output speed relationship, and a second input shaft including step-down motion transmission means coupled to said output shaft in a relatively high input-to-output speed relationship, one of said shafts being hollow and concentrically surrounding the other input shaft for relative axial movement, a first control knob mounted on said first input shaft in axially movable relationship to the second input shaft, means to engage said knob and hold it in a centered position against rotation when said knob is moved to one extreme of axial movement, said knob being disengaged from said means to engage said knob to allow limited rotation when said knob is moved to the other extreme of axial movement, and a second control knob mounted on said second input shaft adjacent said first control knob.

References Cited by the Examiner

FOREIGN PATENTS 265,039   2/27   Great Britain.

BROUGHTON G. DURHAM, *Primary Examiner.*